US007331482B1

(12) United States Patent
Fugere

(10) Patent No.: US 7,331,482 B1
(45) Date of Patent: Feb. 19, 2008

(54) DISPENSE PUMP WITH HEATED PUMP HOUSING AND HEATED MATERIAL RESERVOIR

(75) Inventor: Jeffrey P. Fugere, Sandown, NH (US)

(73) Assignee: DL Technology, LLC, Haverhill, MA (US)

( * ) Notice: Subject to any disclaimer, the term of this patent is extended or adjusted under 35 U.S.C. 154(b) by 612 days.

(21) Appl. No.: 10/810,236

(22) Filed: Mar. 26, 2004

Related U.S. Application Data

(60) Provisional application No. 60/546,886, filed on Feb. 23, 2004, provisional application No. 60/458,528, filed on Mar. 28, 2003.

(51) Int. Cl.
*B67D 5/63* (2006.01)
*G01F 11/22* (2006.01)

(52) U.S. Cl. ...................... 222/1; 222/146.5; 222/333; 222/413

(58) Field of Classification Search ............ 222/146.5, 222/333, 386, 413, 1
See application file for complete search history.

(56) References Cited

U.S. PATENT DOCUMENTS 2,933,259 A 4/1960 Raskin
3,355,766 A 12/1967 Causemann
3,394,659 A 7/1968 Van Alen
3,507,584 A 4/1970 Robbins, Jr.
3,693,884 A 9/1972 Snodgrass et al.
3,734,635 A 5/1973 Blach et al. .................. 415/72
3,811,601 A 5/1974 Reighard et al. ........... 222/146
3,938,492 A 2/1976 Mercer, Jr. ................ 125/11 R
3,963,151 A 6/1976 North, Jr. .................. 222/309
4,004,715 A 1/1977 Williams et al. ............. 222/30
4,077,180 A 3/1978 Agent et al. .................. 53/37

(Continued)

FOREIGN PATENT DOCUMENTS

EP 0110591 10/1986

OTHER PUBLICATIONS

Karassik, et al, "Pump Hand Book", Second Ed., McGraw Hill Inc., 1986, pp. 9.30.

(Continued)

*Primary Examiner*—Joseph A. Kaufman
(74) *Attorney, Agent, or Firm*—Mills & Onello LLP

(57) ABSTRACT

A heated dispense pump overcomes the limitations of conventional systems providing for reliable and efficient heating of the dispensed material in a system that is compact, lightweight, and accurate. A pump housing and cartridge body are formed of a thermally conductive material such as copper, aluminum, or an alloy combination thereof. A heater element is applied directly to the body of the pump housing, and a thermocouple is included to provide for closed-loop controllability. The material flows though the cartridge body and is heated prior to release at the dispense tip. The heated elements, including the pump housing and cartridge body, are thermally insulated from the pump motor and pump gantry to prevent the escape of heat from the system and to protect those adjacent components from heat damage. An optional syringe heater is provided for heating the material in the syringe, and for controlling the temperature of the material, in closed-loop fashion. In this manner, the temperature of the material in the syringe and the temperature of the material in the pump can be controlled independently of each other.

64 Claims, 7 Drawing Sheets

U.S. PATENT DOCUMENTS

| | | | | |
|---|---|---|---|---|
| 4,116,766 | A | 9/1978 | Poindexter et al. | 176/38 |
| 4,168,942 | A | 9/1979 | Firth | |
| 4,197,070 | A * | 4/1980 | Koschmann | 425/135 |
| 4,239,462 | A | 12/1980 | Dach et al. | 417/373 |
| 4,258,862 | A | 3/1981 | Thorsheim | 222/56 |
| 4,312,630 | A | 1/1982 | Travaglini | 425/568 |
| 4,339,840 | A | 7/1982 | Monson | 15/321 |
| 4,377,894 | A | 3/1983 | Yoshida | |
| 4,408,699 | A | 10/1983 | Stock | |
| 4,465,922 | A * | 8/1984 | Kolibas | 392/484 |
| 4,513,190 | A | 4/1985 | Ellett et al. | 219/56.21 |
| 4,572,103 | A | 2/1986 | Engel | 118/697 |
| 4,584,964 | A | 4/1986 | Engel | 118/697 |
| 4,610,377 | A | 9/1986 | Rasmussen | 222/288 |
| 4,705,218 | A | 11/1987 | Daniels | |
| 4,705,611 | A | 11/1987 | Grimes et al. | 204/129.1 |
| 4,785,996 | A | 11/1988 | Ziecker et al. | 239/298 |
| 4,803,124 | A | 2/1989 | Kunz | |
| 4,836,422 | A | 6/1989 | Rosenberg | 222/190 |
| 4,859,073 | A | 8/1989 | Howseman, Jr. et al. | 366/195 |
| 4,917,274 | A | 4/1990 | Asa et al. | |
| 4,919,204 | A | 4/1990 | Baker et al. | 166/223 |
| 4,941,428 | A | 7/1990 | Engel | 118/680 |
| 4,969,602 | A | 11/1990 | Scholl | 239/298 |
| 5,106,291 | A | 4/1992 | Gellert | 425/549 |
| 5,130,710 | A | 7/1992 | Salazar | 341/11 |
| 5,161,427 | A | 11/1992 | Fukuda et al. | |
| 5,176,803 | A | 1/1993 | Barbuto et al. | 204/129.1 |
| 5,177,901 | A | 1/1993 | Smith | 51/5 D |
| RE34,197 | E | 3/1993 | Engel | 118/680 |
| 5,265,773 | A | 11/1993 | Harada | 222/261 |
| 5,348,453 | A | 9/1994 | Baran et al. | 417/440 |
| 5,407,101 | A | 4/1995 | Hubbard | 222/146.5 |
| 5,452,824 | A | 9/1995 | Danek et al. | 222/47 |
| 5,535,919 | A | 7/1996 | Ganzer et al. | 222/1 |
| 5,553,742 | A | 9/1996 | Maruyama et al. | |
| 5,564,606 | A | 10/1996 | Engel | 222/261 |
| 5,567,300 | A | 10/1996 | Datta et al. | |
| 5,699,934 | A | 12/1997 | Kolcun et al. | 222/1 |
| 5,765,730 | A | 6/1998 | Richter | 222/590 |
| 5,785,068 | A | 7/1998 | Sasaki et al. | 134/144 |
| 5,795,390 | A | 8/1998 | Cavallaro | 118/314 |
| 5,819,983 | A | 10/1998 | White et al. | 222/1 |
| 5,823,747 | A | 10/1998 | Ciavarini et al. | 417/216 |
| 5,833,851 | A | 11/1998 | Adams et al. | 210/413 |
| 5,837,892 | A | 11/1998 | Cavallaro et al. | 73/149 |
| 5,886,494 | A | 3/1999 | Prentice et al. | |
| 5,903,125 | A | 5/1999 | Prentice et al. | 318/625 |
| 5,904,377 | A | 5/1999 | Throup | 285/39 |
| 5,918,648 | A | 7/1999 | Carr et al. | |
| 5,925,187 | A | 7/1999 | Freeman et al. | |
| 5,927,560 | A | 7/1999 | Lewis et al. | |
| 5,931,355 | A | 8/1999 | Jefferson | 222/413 |
| 5,947,022 | A | 9/1999 | Freeman et al. | 101/123 |
| 5,947,509 | A | 9/1999 | Ricks et al. | |
| 5,957,343 | A | 9/1999 | Cavallaro | 222/504 |
| 5,971,227 | A | 10/1999 | White et al. | 222/333 |
| 5,984,147 | A | 11/1999 | Van Ngo | 222/240 |
| 5,985,029 | A | 11/1999 | Purcell | 118/324 |
| 5,985,216 | A | 11/1999 | Rens et al. | 422/73 |
| 5,992,688 | A | 11/1999 | Lewis et al. | 222/1 |
| 5,992,698 | A | 11/1999 | Copeland et al. | |
| 5,995,788 | A | 11/1999 | Back | |
| 6,007,631 | A | 12/1999 | Prentice et al. | 118/669 |
| 6,017,392 | A | 1/2000 | Cavallaro | 118/314 |
| 6,025,689 | A | 2/2000 | Prentice et al. | 318/625 |
| 6,068,202 | A | 5/2000 | Hynes et al. | 239/290 |
| 6,082,289 | A | 7/2000 | Cavallaro | 118/300 |
| 6,085,943 | A | 7/2000 | Cavallaro et al. | 222/309 |
| 6,093,251 | A | 7/2000 | Carr et al. | 118/712 |
| 6,112,588 | A | 9/2000 | Cavallaro et al. | 73/149 |
| 6,119,895 | A | 9/2000 | Fugere et al. | 222/1 |
| 6,126,039 | A | 10/2000 | Cline et al. | 222/63 |
| 6,157,157 | A | 12/2000 | Prentice et al. | 318/625 |
| 6,196,521 | B1 | 3/2001 | Hynes et al. | 251/61.1 |
| 6,199,566 | B1 | 3/2001 | Gazewood | |
| 6,206,964 | B1 | 3/2001 | Purcell et al. | 118/314 |
| 6,207,220 | B1 | 3/2001 | Doyle et al. | 427/96 |
| 6,214,117 | B1 | 4/2001 | Prentice et al. | 118/669 |
| 6,216,917 | B1 | 4/2001 | Crouch | 222/146.5 |
| 6,224,671 | B1 | 5/2001 | Cavallaro | 118/314 |
| 6,224,675 | B1 | 5/2001 | Prentice et al. | 118/669 |
| 6,234,358 | B1 | 5/2001 | Romine et al. | 222/181.3 |
| 6,253,957 | B1 | 7/2001 | Messerly et al. | |
| 6,253,972 | B1 | 7/2001 | DeVito et al. | 222/504 |
| 6,257,444 | B1 | 7/2001 | Everett | 222/1 |
| 6,258,165 | B1 | 7/2001 | Cavallaro | 118/323 |
| 6,322,854 | B1 | 11/2001 | Purcell et al. | 427/421 |
| 6,324,973 | B2 | 12/2001 | Rossmeisl et al. | 101/123 |
| 6,354,471 | B2 | 3/2002 | Fujii | |
| 6,371,339 | B1 | 4/2002 | White et al. | 222/413 |
| 6,378,737 | B1 | 4/2002 | Cavallaro et al. | 222/309 |
| 6,383,292 | B1 | 5/2002 | Brand et al. | 118/315 |
| 6,386,396 | B1 | 5/2002 | Strecker | 222/261 |
| 6,391,378 | B1 | 5/2002 | Carr et al. | 427/8 |
| 6,395,334 | B1 | 5/2002 | Prentice et al. | |
| 6,412,328 | B1 | 7/2002 | Cavallaro et al. | |
| 6,453,810 | B1 | 9/2002 | Rossmeisl et al. | |
| 6,511,301 | B1 | 1/2003 | Fugere | |
| 6,514,569 | B1 | 2/2003 | Crouch | 427/421 |
| 6,540,832 | B2 | 4/2003 | Cavallaro | 118/314 |
| 6,541,063 | B1 | 4/2003 | Prentice et al. | 427/8 |
| 6,562,406 | B1 | 5/2003 | Chikahisa et al. | 427/256 |
| 6,619,198 | B2 | 9/2003 | Rossmeisl et al. | 101/129 |
| 6,626,097 | B2 | 9/2003 | Rossmeisl et al. | 101/123 |
| 6,736,900 | B2 * | 5/2004 | Isogai et al. | 118/663 |
| 6,739,483 | B2 * | 5/2004 | White et al. | 222/413 |
| 6,957,783 | B1 | 10/2005 | Fugere | |
| 6,983,867 | B1 | 1/2006 | Fugere | |
| 2002/0007227 | A1 | 1/2002 | Prentice et al. | 700/121 |
| 2002/0020350 | A1 | 2/2002 | Prentice et al. | 118/669 |
| 2003/0000462 | A1 | 1/2003 | Prentice et al. | |
| 2003/0066546 | A1 | 4/2003 | Bibeault et al. | 134/21 |
| 2003/0084845 | A1 | 5/2003 | Prentice et al. | 118/679 |
| 2003/0091727 | A1 | 5/2003 | Prentice et al. | 427/8 |
| 2003/0132243 | A1 | 7/2003 | Engel | 222/61 |
| 2004/0089228 | A1 | 5/2004 | Prentice et al. | |

OTHER PUBLICATIONS

Micro-Mechanics Design Specifications, May 1999.

Ulrich, Rene, "Epoxy Die Attach: The Challenge of Big Chips", Semiconductor International, Oct. 1994.

Sela, Uri, et al, "Dispensing Technology: The Key to High-Quality, High Speed, Die-Bonding", Microelectronics Manufacturing Technology, Feb. 1991.

* cited by examiner

DISPENSE PUMP WITH HEATED PUMP HOUSING AND HEATED MATERIAL RESERVOIR

RELATED APPLICATIONS

This application claims the benefit of U.S. Provisional Patent Application Ser. No. 60/546,886, filed Feb. 23, 2004 and U.S. Provisional Patent Application Ser. No. 60/458,528, filed Mar. 28, 2003, the contents of which are incorporated herein by reference, in their entirety.

This application is related to U.S. patent application Ser. No. 10/424,273, filed Apr. 28, 2003, now U.S. Pat. No. 6,983,867; U.S. patent application Ser. No. 10/295,730, filed Nov. 15, 2002, now U.S. Pat. No. 6,851,923; U.S. patent application Ser. No. 10/054,084, filed Jan. 22, 2002, now U.S. Pat. No. 6,892,959; U.S. patent application Ser. No. 10/038,381, filed Jan. 4, 2002, now U.S. Pat. No. 6,957,783; and U.S. patent application Ser. No. 09/702,522, filed Oct. 31, 2000, now U.S. Pat. No. 6,511,301, the contents of each being incorporated herein by reference, in their entirety.

BACKGROUND OF THE INVENTION

Contemporary fluid dispense systems are well suited for dispensing precise amounts of fluid at precise positions on a substrate. A pump transports the fluid to a dispense tip, also referred to as a "pin" or "needle", which is positioned over the substrate by a micropositioner, thereby providing patterns of fluid on the substrate as needed. As an example application, fluid delivery systems can be utilized for depositing precise volumes of adhesives, for example, glue, resin, or paste, during a circuit board assembly process, in the form of dots for high-speed applications, or in the form of lines for providing underfill or encapsulation.

Contemporary dispensing pumps comprise a syringe, a feed tube, a dispense cartridge, and a pump drive mechanism. The syringe contains fluid for dispensing, and has an opening at its distal end at which a feed tube is connected. The feed tube is a flexible, or rigid, hollow tube for delivering the fluid to the cartridge. The cartridge is hollow and cylindrical and includes an inlet neck at which the opposite end of the feed tube is connected. The inlet neck directs the fluid into the hollow, central cartridge chamber.

A feed screw disposed longitudinally through the center of the cylindrical chamber transports the fluid in Archimedes principle fashion from the inlet to a dispensing needle attached to the chamber outlet. A motor drives the feed screw via a rotary clutch, which is selectively actuated to engage the feed screw and thereby effect dispensing. Alternatively, a closed loop servomotor may be employed for providing precise control over the angular position, velocity and acceleration of the rotation of the feed screw during a dispensing operation, as described in U.S. Pat. No. 6,511,301, incorporated herein by reference above. A bellows linkage between the motor and cartridge allows for flexibility in system alignment.

Pump systems can be characterized generally as "fixed-z" or "floating-z" (floating-z is also referred to as "compliant-z"). Fixed-z systems are adapted for applications that do not require contact between the dispense tip and the substrate during dispensing. In fixed-z applications, the dispense tip is positioned and suspended above the substrate by a predetermined distance, and the fluid is dropped onto the substrate from above. In floating-z applications, the tip is provided with a standoff, or "foot", designed to contact the substrate as fluid is delivered by the pump through the tip. Such floating-z systems allow for tip travel, relative to the pump body, such that the entire weight of the pump does not bear down on the substrate.

In certain applications, the material being dispensed is heated in order to lessen its viscosity. Heating of the material also allows for improved control over process temperature, for example in environments where ambient temperature can vary greatly over the course of a day, or over the course of a year.

The heating of material flow has been accomplished in a number of ways. In one approach, a heated reservoir is placed in line with the feed tube such that the material enters the pump already heated. However, this approach leads to a more complicated configuration that is difficult to clean.

In another approach, hot air is generated and circulated down the fluid path. However, this approach is mechanically complex, and involves the movement of air above components, which can affect the reliability of the dispensing operation.

In another approach, resistive heaters are formed in the shape of cylindrical cartridges that are mounted to the pump body. In such heaters, referred to in the industry as "cartridge" heaters, a cylindrical metal jacket encases a resistive winding. In these embodiments, the heat tends to be localized to the region of the cylinder. In addition, due to the tolerances of the cylinder, air gaps can form between the inner circumference of the cylinder and the body of the pump, leading to inaccurate and inefficient heating.

SUMMARY OF THE INVENTION

The present invention is directed to a heated dispense pump that overcomes the limitations of the conventional systems set forth above. In particular, the present invention provides for a reliable and efficient heating of the material in a system that is compact, lightweight, and accurate.

The present invention includes a pump housing and cartridge body that are formed of a thermally conductive material such as copper, aluminum, or an alloy combination thereof. A heater element is applied directly to the body of the pump housing, and a thermocouple is included to provide for closed-loop controllability. The material flows though the cartridge body and is heated prior to release at the dispense tip. The heated elements, including the pump housing and cartridge body, are thermally insulated from the pump motor and pump gantry to prevent the escape of heat from the system and to protect those components from heat damage.

In another embodiment, an optional syringe heater and thermocouple are provided for heating the material in the syringe, and for controlling the temperature of the material in the syringe in closed-loop fashion. An independent controller and heater element are provided for the syringe so that the temperature of the material in the syringe and the temperature of the material in the pump can be controlled independently of each other. The interface between the syringe and pump body is insulated, so that heat does not flow between the respective bodies, maintaining the independence of their respective heating systems.

In one aspect, the present invention is directed to a material dispense pump. A pump body is formed of thermally conductive material. A motor includes an output axle. A pump cartridge is formed of thermally conductive material, the pump cartridge having an auger screw driven by the output axle of the motor for dispensing material, the pump cartridge being in thermal communication with the pump body. A motor mount mounts the motor to the pump body, the motor mount comprising a thermally insulating material that thermally insulates the motor from the pump body. A pump body heater is in thermal communication with the pump body for applying heat to the pump body and cartridge.

In one embodiment, the cartridge comprises a material selected from the group consisting of aluminum, copper, aluminum alloy, copper alloy, and aluminum-copper alloy.

In another embodiment, an auger coupler couples the motor axle to the auger screw, the auger coupler comprising thermally insulating material, for example Ultem™, that thermally insulates the motor axle and auger screw.

In another embodiment, the pump body heater comprises a heater and a temperature monitoring device. The pump further includes a pump body heater controller for controlling the temperature of the pump body in response to a signal received from the temperature monitoring device. The pump body heater comprises a resistive heater and the temperature monitoring device comprises a thermocouple. The pump body heater controller, the pump body heater, and the temperature monitoring device are configured as a closed loop heat control system for controlling the temperature of the pump body.

In another embodiment, a pump body heater plate that abuts a surface of the pump body, the pump body heater plate comprising a thermally insulating material, for example Ultem®, wherein the pump body heater is seated at an outer surface the pump body heater plate to interface with the surface of the pump body. The pump body heater plate further comprises a compression mechanism that urges the pump body heater toward physical contact with the surface of the pump body. A quick release mounting plate mates with a latch plate for mounting the material dispense pump to a base, the quick release mounting plate being coupled to the pump body heater plate such that the quick release mounting plate is thermally insulated from the pump body.

In another embodiment, cartridge retention screws retain the pump cartridge in the pump body, an outer surface of the cartridge retention screws comprising thermally insulating material. A dispense tip retention nut is further included for mounting a dispense tip to the pump cartridge, an outer surface of the dispense tip retention nut comprising thermally insulating material. The thermally insulating material comprises Ultem™.

In another embodiment, the motor comprises a closed-loop servo motor having indexed rotational positions.

In another embodiment, the material dispense pump further comprises a material reservoir heater for heating material contained in a material reservoir to be dispensed by the pump cartridge. The material reservoir heater comprises a heater and a temperature monitoring device and a material reservoir heater controller is further included for controlling the temperature of the material in response to a signal received from the temperature monitoring device. The material reservoir heater comprises, for example, a resistive heater and the temperature monitoring device comprises a thermocouple. A heat distribution body comprising heat conductive material is in thermal communication with the material reservoir heater that houses the material reservoir and heats material contained in the reservoir. In one example, the material reservoir comprises a material syringe, and the heat distribution body is cylindrical in shape. A reservoir support mount supports the heat distribution body and the material reservoir, wherein the reservoir support mount is formed of thermally insulating material such as Ultem™ that thermally insulates the heat distribution body from the pump body. The material reservoir heater controller, the material reservoir heater, and the temperature monitoring device are configured as a closed loop heat control system for controlling the temperature of the material reservoir.

In another aspect, the present invention is directed to a material dispense pump. A pump body is formed of thermally conductive material. A motor has an output axle. A pump cartridge is formed of thermally conductive material, the pump cartridge having an auger screw driven by the output axle of the motor for dispensing material, the pump cartridge being in thermal communication with the pump body. A pump body heater is in thermal communication with the pump body for applying heat to the pump body and cartridge. A material reservoir heater is in thermal communication with a material reservoir containing material to be dispensed for applying heat to the material, wherein the material reservoir heater and pump body heater operate independently to control the temperature of the pump body and cartridge and the temperature of the material.

In one embodiment, a motor mount mounts the motor to the pump body, the motor mount comprising a thermally insulating material such as Ultem™ that thermally insulates the motor from the pump body.

In another aspect, the present invention is directed to a method for controlling a material dispense pump. The temperature of a pump body is controlled, the pump body formed of thermally conductive material and having a pump cartridge formed of thermally conductive material, the pump cartridge having an auger screw driven by a motor for dispensing material, the pump cartridge being in thermal communication with the pump body. The temperature of a material reservoir containing material to be dispensed by the pump cartridge is also controlled. Control of the temperature of the pump body and control of the temperature of a material reservoir are independent.

In one embodiment, controlling the temperature of the pump body comprises monitoring the temperature of the pump body, and applying heat to the pump body in response to monitored temperature. Controlling the temperature of the material reservoir comprises monitoring the temperature of the material reservoir, and applying heat to the material reservoir in response to monitored temperature.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
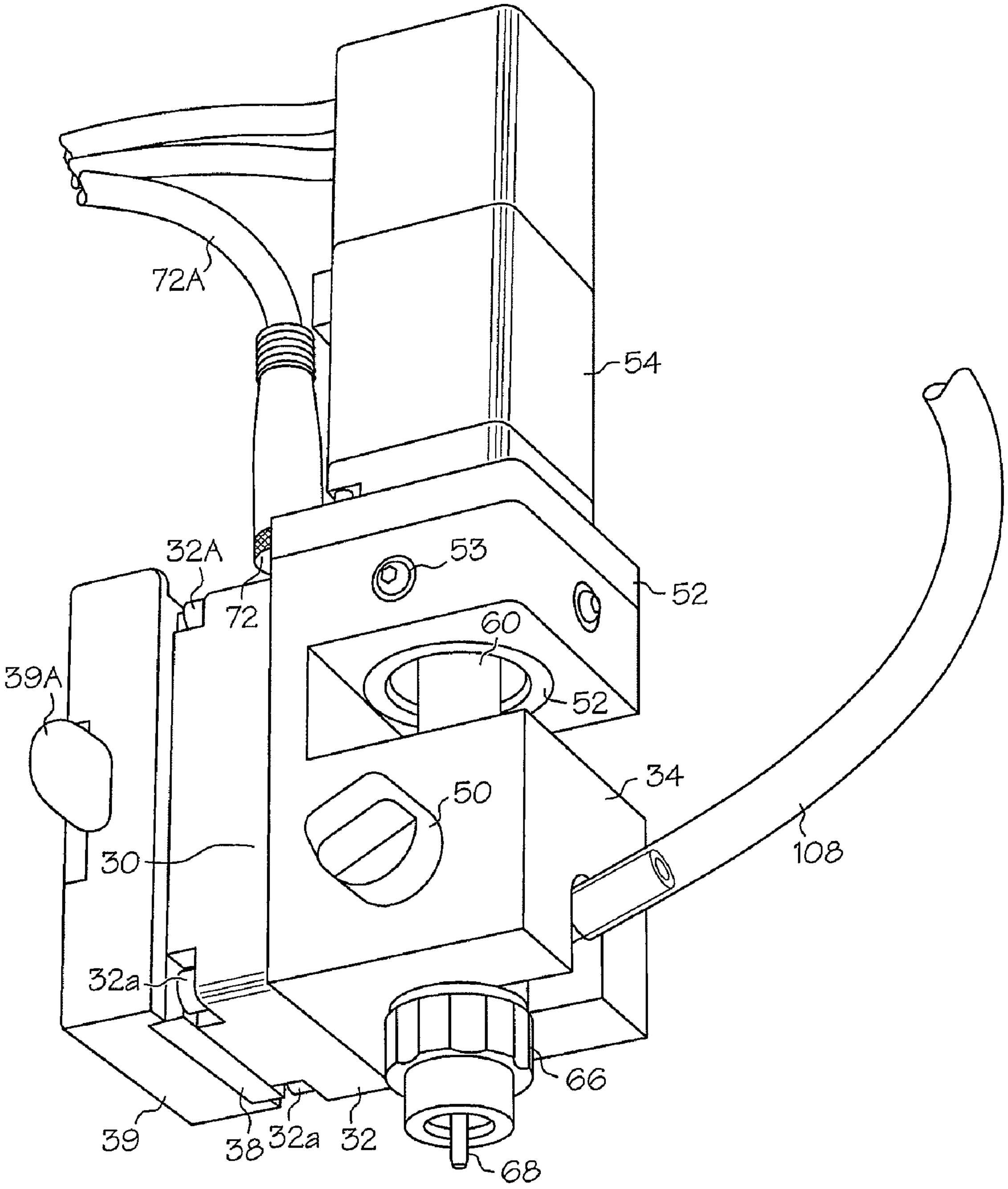
FIG. 1 is a perspective view of a heated fluid dispense pump assembly configured in accordance with the present invention.
Figures 2A, 2B:
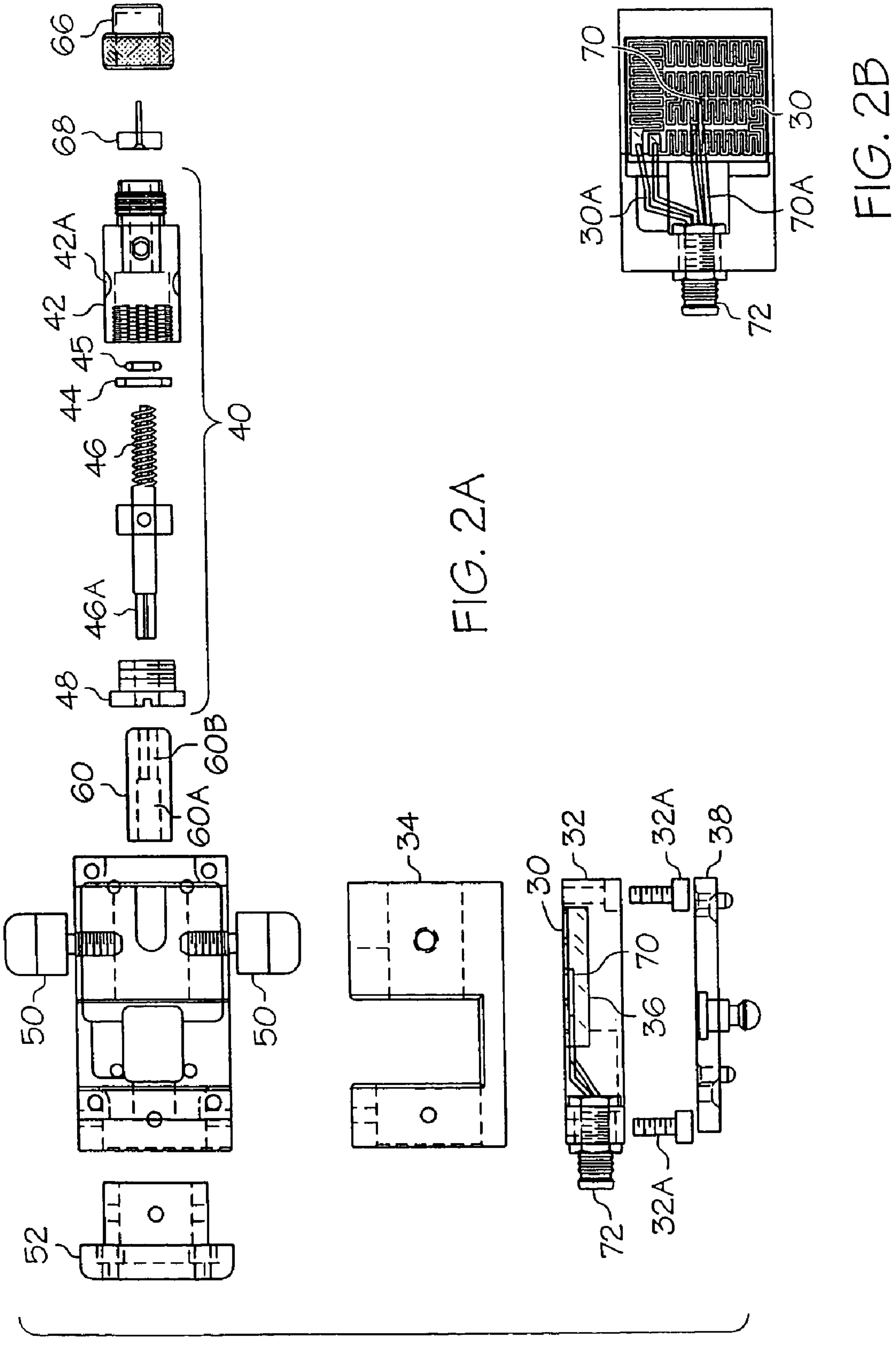
FIG. 2A is an exploded top and side view of the heated fluid dispense pump assembly of FIG. 1 in accordance with the present invention.
FIG. 2B is a top view of the pump body heater of FIG. 2A, in accordance with the present invention.

FIG. 1 is a perspective view of a heated fluid dispense pump assembly configured in accordance with the present invention. FIG. 2A is an exploded top side view of the heated fluid dispense pump assembly of FIG. 1 in accordance with the present invention. FIG. 2B is a side view of the pump body heater of FIG. 2A, in accordance with the present invention.

The components and operation of the dispense pump depicted in FIGS. 1 and 2 are similar in form and purpose to those disclosed in the embodiments of the patent applications referenced above, and incorporated herein by reference. The dispense pump includes a pump housing or body 34, a motor 54, and a cartridge assembly 40. A coupling 60 includes a first opening 60A that interfaces with an axle of the motor 54 and includes a second opening 60B that interfaces with a top portion 46A of the auger screw 46. The motor 54 and cartridge assembly 40 are mounted to the pump housing 34 and communicate via the coupling 60 such that rotational movement of the motor axle induces rotational movement of the auger screw 46 in the cartridge assembly 40, as described in the referenced patent applications.

In the embodiment of the present invention as shown in FIGS. 1 and 2, a heater element 30 is disposed at an outer surface of a heater plate 32. The heater plate 32 is mounted to the pump housing 34, for example via machine screws 32A such that the heater element 30 is in direct thermal contact with the pump housing 34. A foam insulator insert 36, for example comprising silicone foam rubber, is seated in the heater plate 32 beneath the heater element 30, in a cavity formed in the heater plate 32, and is under compression when mounted in order to outwardly urge the heater element 30 against the body of the pump housing 34. A quick-release mount plate 38 is mounted to the heater plate 32 opposite the pump housing 34. As described in the referenced patent applications, the quick-release mount plate 38 allows the pump to be removably secured to a pump positioning gantry or other pumping system base. A mating latch plate 39 includes a button release mechanism 39A for mounting the dispense pump to a gantry, as described in U.S. Pat. No. 6,511,301, incorporated herein by reference above.

With reference to FIG. 2B, the heater element 30 comprises, for example, a resistive heating element with a high degree of temperature control and reliability, for example a 24 Volt, 40 Watt Kapton™ heater unit, available from High-Heat industries, Lewistown, Mont., U.S.A. The heater element 30 preferably includes a thermocouple unit 70, for example, a 100 ohm RTD thermocouple, for monitoring the temperature at the junction of the heater element 30 and the pump housing 34, at the point closest to the location of material flow. The heater element 30 preferably contacts the pump housing 34 over a wide area, so as to distribute the applied heat evenly across the body of the housing 34.

The temperature of the heater element 30 is preferably controlled by a digital controller 62 (see FIG. 4B, below), for example a Eurotherm™ digital controller, available from Eurotherm Controls, Inc., Louisbourg, Va., U.S.A. The digital controller 62 is coupled to both the heater element 30 and thermocouple 70 at connector 72 via wires 30A and 70A respectively (see FIG. 2B). The signals from wires 30A, 70A are exchanged with the digital controller 62 via connector 72 and cable 72A. In this manner, the combined operation of the heater element 30 and thermocouple 70 provide for desirable closed-loop control of the heater element 30 by the controller, with knowledge of the temperature in the heated environment. Other types of controllers, including analog controllers, that ensure closed-loop operation, are also applicable to the present invention.

A cartridge assembly 40, including cartridge 42, washer 44, O-ring 45, auger 46 and spanner nut 48, is disposed within the pump housing 34. The cartridge assembly 40 operates in a manner similar to that disclosed in the referenced applications, and is secured in place in the pump housing 34 using thumb lock knobs and screws 50. The thumb lock knobs and screws 50 mate with an indentation 42A in the cartridge body, for fixing the cartridge in place in a fixed-z application, or mate with a groove formed in the cartridge body to allow the cartridge to move longitudinally, in a floating-z application. In a preferred embodiment, the fluid enters the auger region at an elongated chamber or slot along the side of the auger threads, as described in U.S. Pat. No. 6,511,301.

A motor mount 52 secures a motor 54 to the pump housing 34. The motor mount 52 is secured to the pump housing by machine screws 53, and the motor is likewise mounted to the motor mount by machine screws (not shown). The motor 54 comprises, for example, a closed-loop servo motor having indexed rotational positions to allow for accurate control over the angular position, velocity, and acceleration of the auger screw during a dispensing operation, as disclosed in U.S. Pat. No. 6,511,301. The motor axle 56 is coupled to the auger 46 by axle coupling 60.

A dispense tip nut 66 secures a dispense tip 68 to the body of the cartridge 40. The dispense tip may comprise, for example, a dispense tip of the type disclosed in U.S. Pat. No. 6,547,167, the content of which is incorporated herein by reference.

The pump housing 34 and cartridge body 42 are preferably formed of a thermally conductive material such as copper, or aluminum, or an alloy combination thereof. In this manner, the pump housing 34 conducts the heat provided by the heater element 30 into the path of material flow through the cartridge body.

During dispensing of material from the dispense tip 68, heat is drawn into the material flow as it passes through the cartridge from the cartridge body 42 and pump housing 34. As heat is drawn, the thermocouple 70 embedded in the heater element 30 senses a reduction in temperature in the pump body 34, and the controller 62 responds by providing additional heat at heater element 30. In this manner, the system operates in closed-loop fashion and provides for reliable heating of the material flow at a predictable temperature.

The heater plate 32, motor mount 52, and coupling 60 are preferably formed of a thermally insulative material, for example Ultem™, a polymer available from Beodeker Plastics, Shiner, Tex., U.S.A. In this manner, the heated pump housing 34 and cartridge body 40 are thermally insulated from the motor 54 by the insulative coupling 60 and the insulative motor mount 52 in order to minimize heat exchange between the respective bodies. In addition, the heated pump housing 34 and cartridge body 40 are thermally insulated from the latch plate 39 and gantry, or other body to which the dispense pump is mounted, by the insulative heater plate 32, in order to minimize heat exchange between the dispense pump body and gantry. In addition, the dispense tip nut 66 and thumb lock screws 50 may additionally be formed of a thermally insulative material such as Ultem™, in order to retain heat and in order to remain cool to the touch for handling purposes.

An optional insulative shroud (not shown) for example formed of silicone rubber or plastic may be applied over the pump housing and cartridge, to further insulate the heated dispense pump from ambient temperatures and to provide for a more controlled thermal environment.

Figure 6:
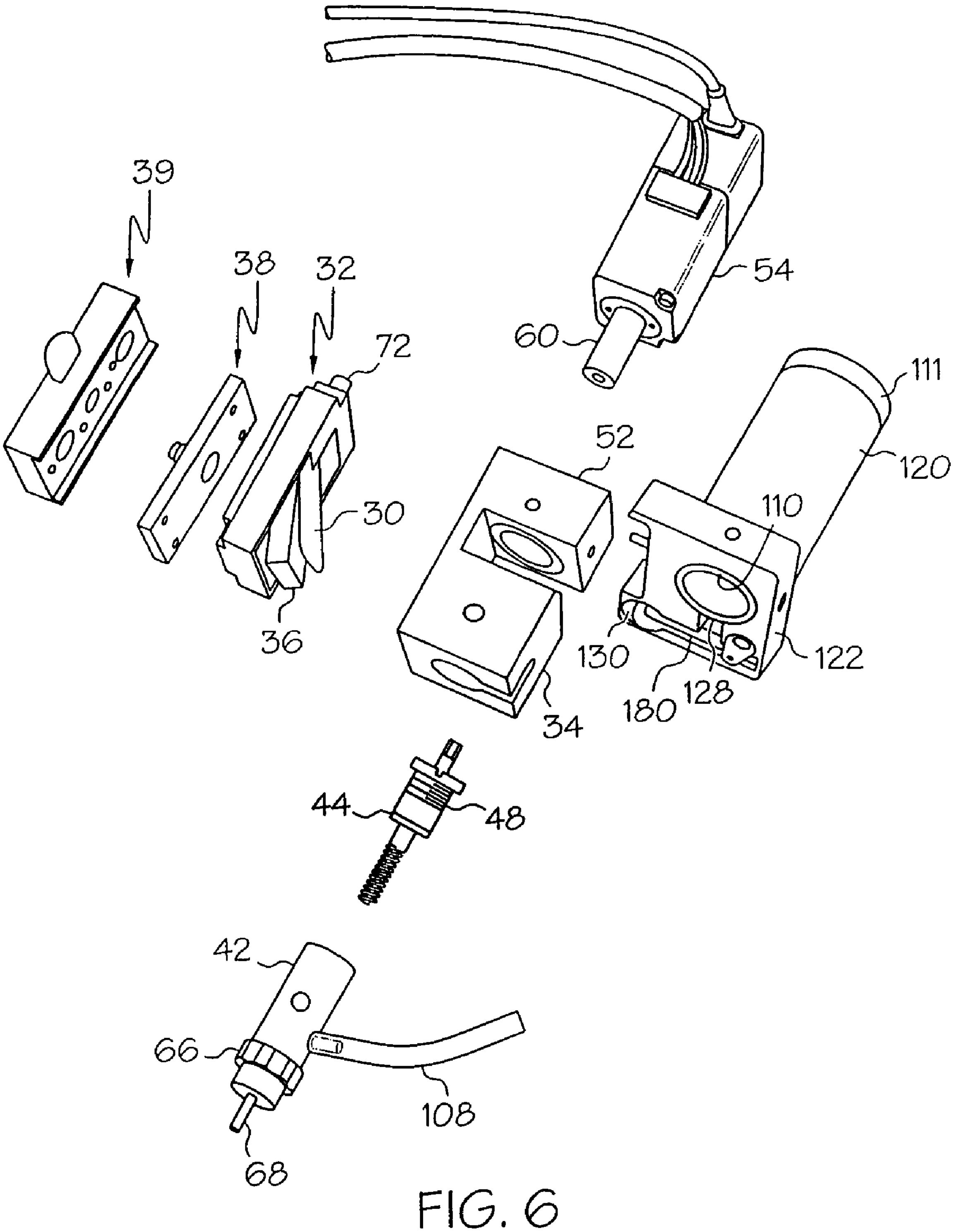
FIG. 6 is an exploded perspective view of the heated pump assembly of FIG. 3, in accordance with the present invention.

In another embodiment, a syringe heater is provided for heating material contained in a dispensing syringe that is mounted to the pump. As shown in the assembled perspective view of FIG. 3 and in the exploded perspective view of FIG. 6, the syringe heater system of the present invention includes a cylindrical hollow tube 110 or other chamber of a geometry suitable for retaining a material reservoir such as a syringe, for example formed of aluminum, or other heat-conductive material. The tube includes a flange 111 on which an inserted syringe head rests. An insulative sleeve 120 insulates the heated tube 110. The cylindrical tube 110 is mounted to a mounting plate 122, which is, in turn mounted to the pump housing 34, for example via machine screws (not shown).

Figure 3:
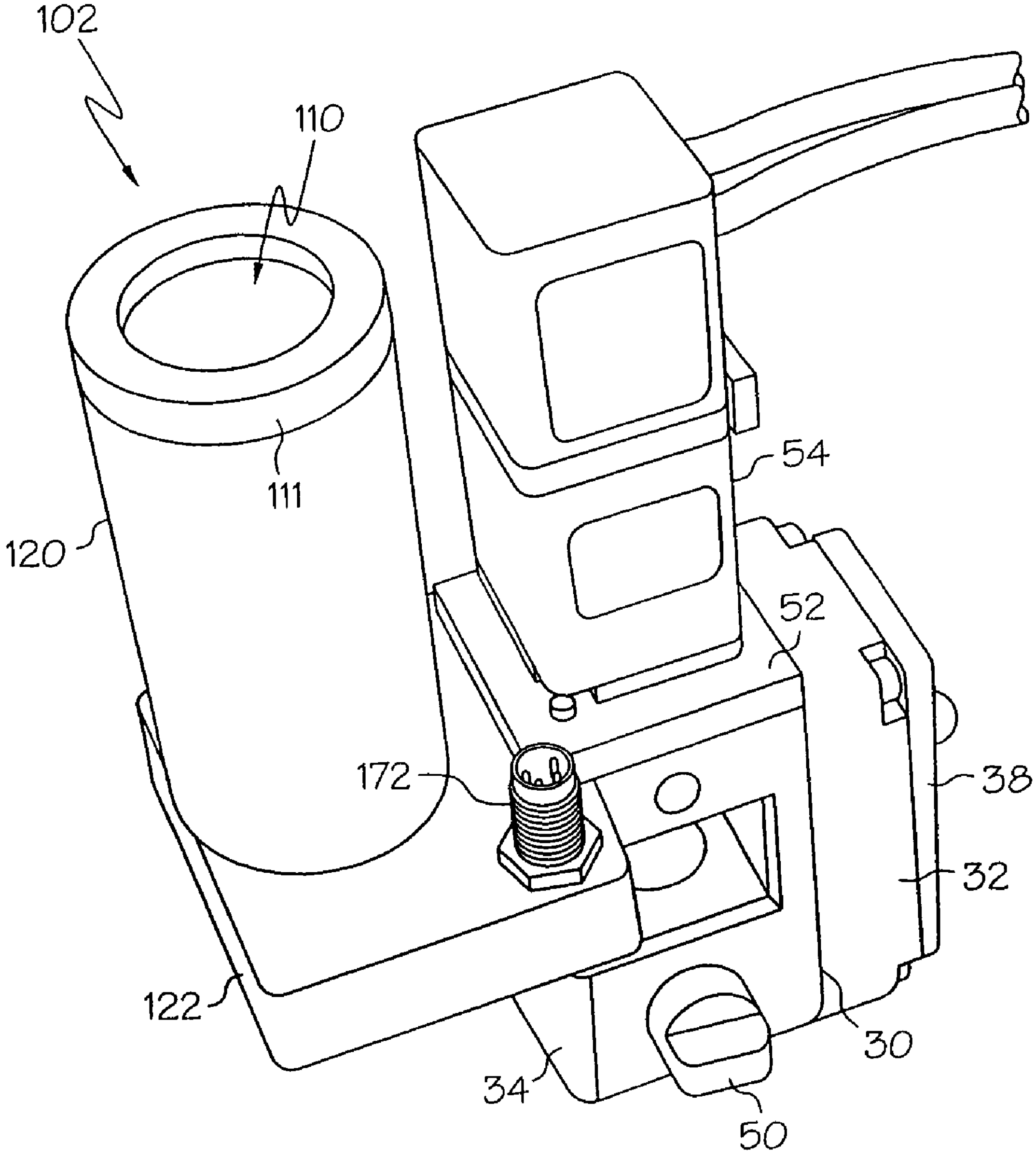
FIG. 3 is a perspective view of heated fluid dispense pump assembly further including a syringe heater, in accordance with the present invention.
Figure 4A:
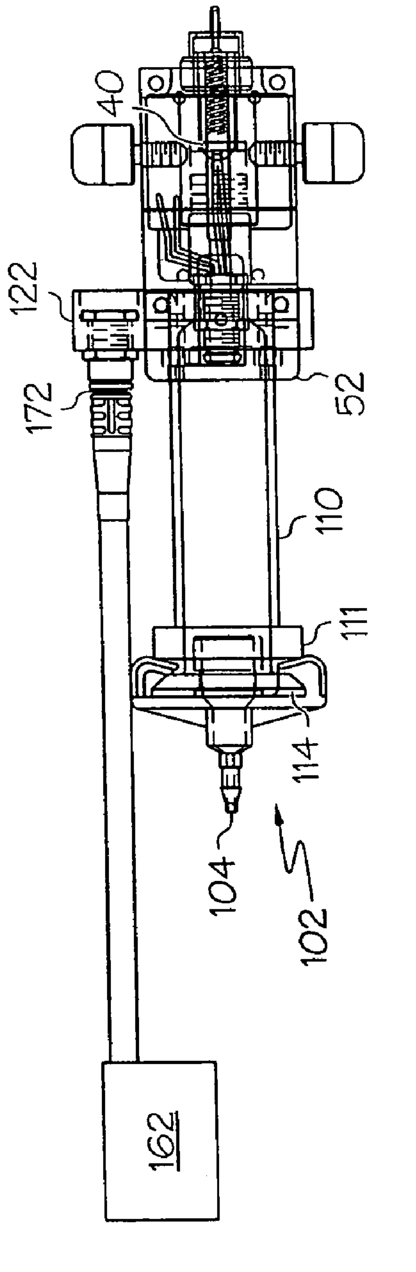
FIGS. 4A and 4B are first and second side views, respectively, of the heated pump assembly of FIG. 3, in accordance with the present invention.
Figure 4B:
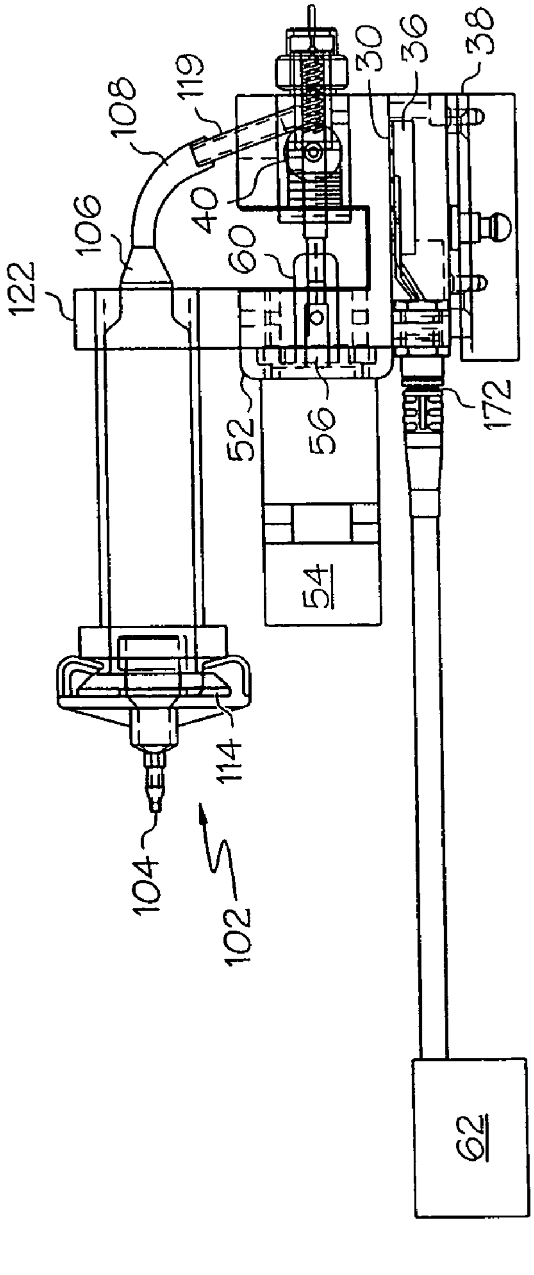

FIGS. 4A and 4B are first and second side views, respectively, of the heated pump assembly of FIG. 3, including a syringe heater 102, in accordance with the present invention. With reference to FIGS. 4A and 4B, the syringe 112 includes an inlet for the application of pressurized air 104, a plunger (not shown) within the body of the syringe, and an outlet 106 at which material is released from the syringe. The pressurized air is applied to the region above the plunger for driving the plunger in a downward direction, thereby serving as a control mechanism for controlling the rate of introduction of material to the pump. The outlet of the syringe 106 communicates with a feed tube 108, in turn communicating with the cartridge inlet neck 119, for introducing material to the dispense pump at the cartridge.

A second control unit 162, for example similar in wattage and control features to those of the digital controller 62 described above in connection with the pump body heater, controls the temperature of the material in the syringe. In this manner, the temperature of the material is stabilized over the course of the day, irrespective of fluctuations in ambient room temperature where the pump is in operation. In addition, the material viscosity can be controlled by elevating the temperature of the material past room temperature in order to increase its viscosity and provide for more regular flow.

Figure 5:
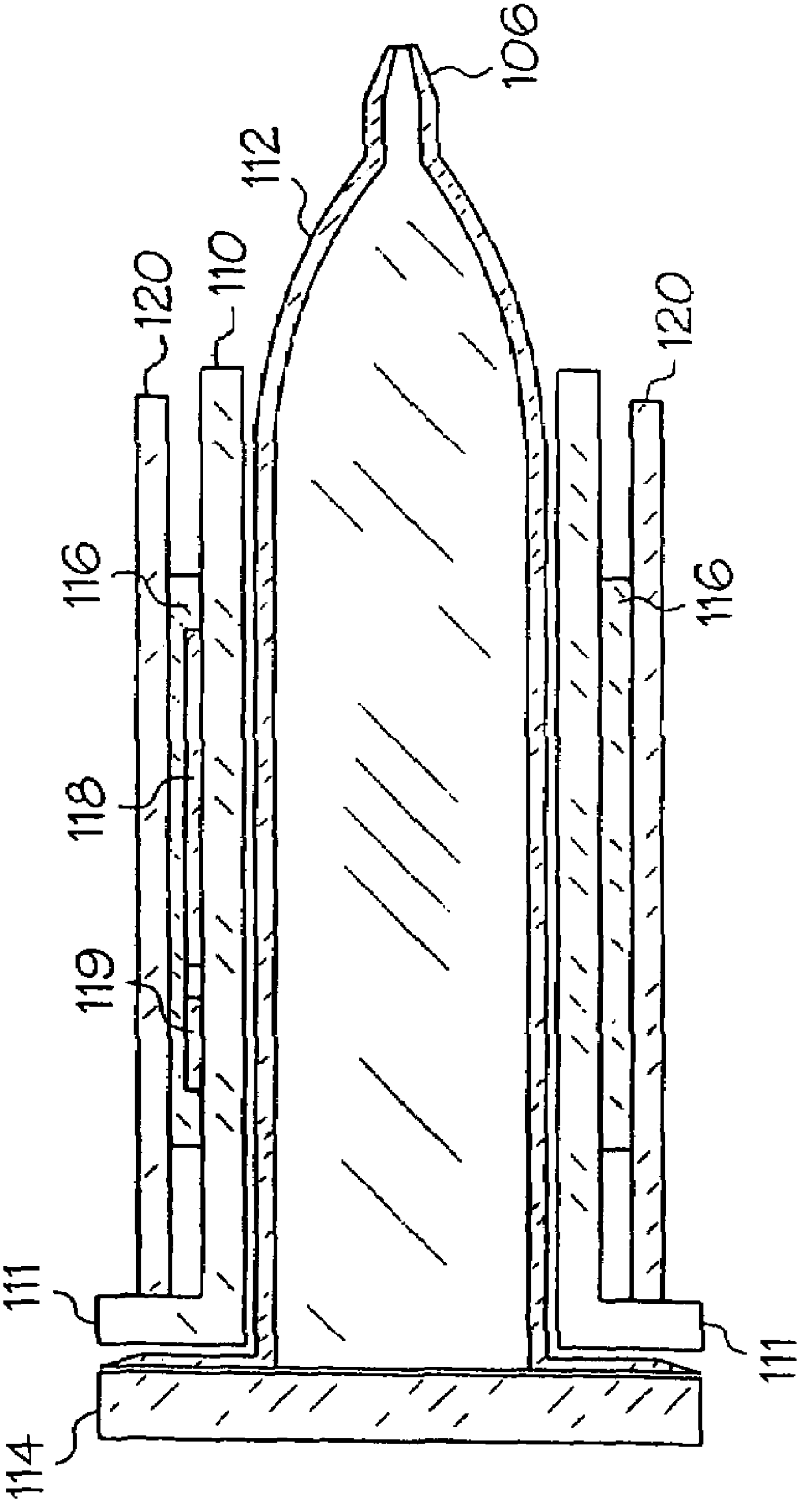
FIG. 5 is a cross-sectional view of the syringe heater of the heated pump assembly of FIG. 3, in accordance with the present invention.
Figure 7:
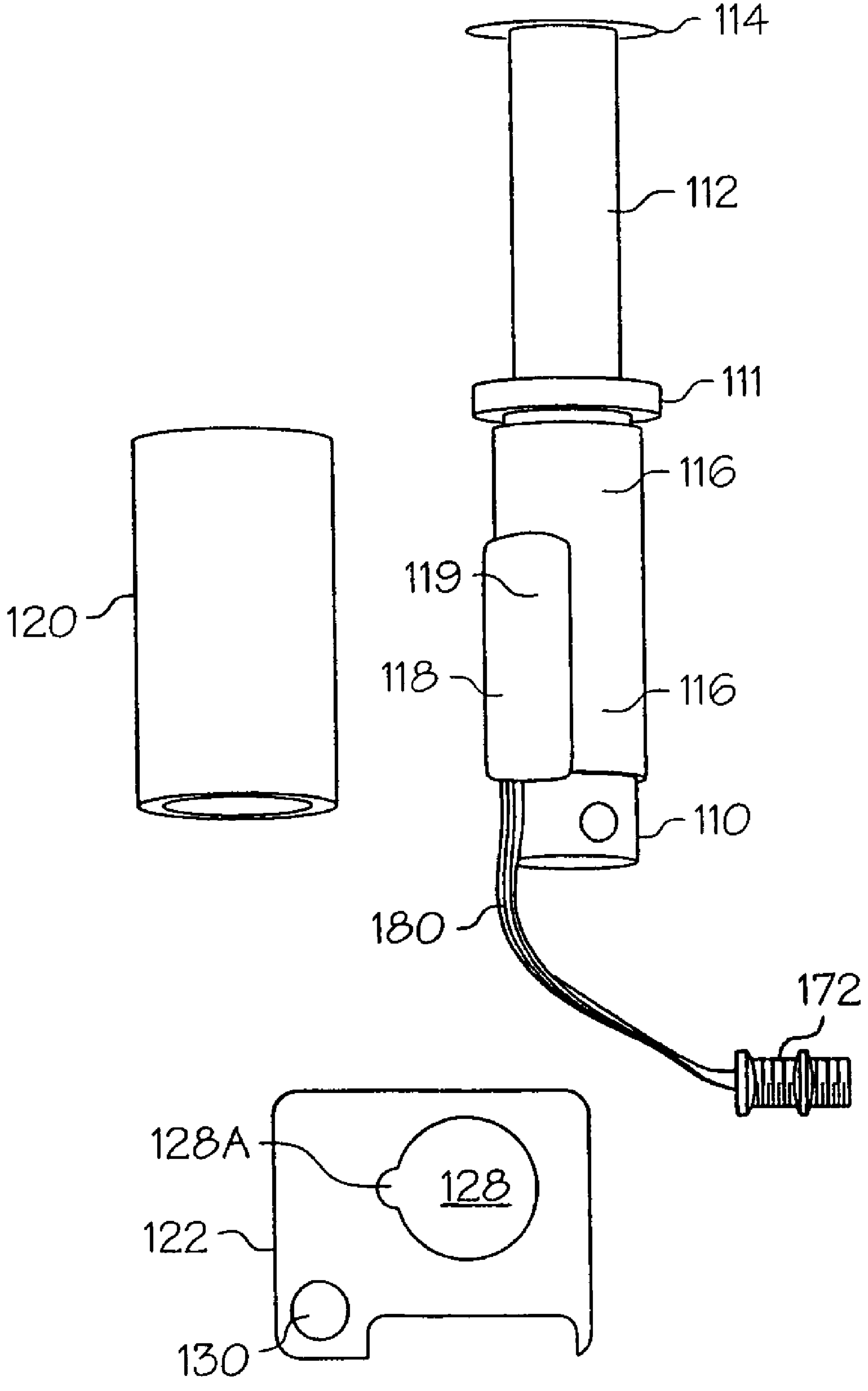
FIG. 7 is an exploded side view of the syringe heater of the heated pump assembly of FIG. 3, in accordance with the present invention.

With additional reference to FIG. 7 and the cutaway side view of FIG. 5, the syringe heating system 102 includes a tubular heat distribution body 110 configured to house a syringe body 112. The heat distribution body 110 is preferably formed of a thermally conductive material such as aluminum in order to distribute applied heat throughout its body. In one example, the syringe body 112 comprises a plastic body. The heat distribution body 110 includes a flange 111 at a first end that rests against the syringe head retention mechanism 114 that couples the pressurized air source to the syringe body. A heater element 118 is in direct contact with the aluminum tube, and is formed, for example, of a flexible, embossed Kapton™ material. A thermocouple 119, for example of type described above, is also provided at, or proximal to, the heater element 118, in order to allow the second controller 162 to take periodic temperature readings. In this manner, the syringe heating system operates in closed-loop fashion, with continuous knowledge of the temperature in the heated environment. A mounting sleeve 116, for example formed of silicone material, retains the heater element 118 in place against the heat distribution body 110. An insulative sleeve 120, for example comprising a rubber tube, encompasses the aluminum tube and heater, providing an insulated environment for the aluminum tube, while physically protecting the heater element.

The syringe and heating apparatus is mounted to the pump body using a mounting plate 122 including a large aperture 128 that receives the aluminum tube 110. The large aperture includes an extension 128A to provide space for passage of the control wires 180 for the heater element 118 and associated thermocouple 119. The mounting plate 122 also includes a small aperture 130 that serves as a mount for connector 172, that transfers signals passed between the controller 162 and the heater 118 and thermocouple 119. The mounting plate 122 is preferably formed of a thermally insulating material, such as Ultem™, or plastic, such that heat generated by the syringe heater system 102 does not migrate to, or otherwise influence, the pump heater 30, and such that heat generated by the pump heater 30 does not influence the syringe heater apparatus. In addition, the second control unit 162 preferably operates independently of the first control unit 62. In this manner, the temperature of the material in the syringe, and the temperature of the material in the pump, can be independently controlled and managed. For example, the temperature of the material in the syringe can be set to 100 F, while the temperature of the material in the pump can be set to 130 F.

While this invention has been particularly shown and described with references to preferred embodiments thereof, it will be understood by those skilled in the art that various changes in form and details may be made herein without departing from the spirit and scope of the invention as defined by the appended claims.

I claim:

1. A material dispense pump comprising:

a pump body formed of thermally conductive material;

a motor having an output axle;

a pump cartridge formed of thermally conductive material, the pump cartridge having an auger screw driven by the output axle of the motor for dispensing material, the pump cartridge being in thermal communication with the pump body, the pump body including a mounting location at which the pump cartridge having the auger screw is inserted into and removed from the pump body;

a motor mount that mounts the motor to the pump body, the motor mount comprising a thermally insulating material that thermally insulates the motor from the pump body; and a pump body heater that generates heat by resistive heating, the pump body heater in direct thermal contact with the pump body to apply the heat to the pump body and cartridge.

2. The material dispense pump of claim 1 wherein the cartridge comprises a material selected from the group consisting of aluminum, copper, aluminum alloy, copper alloy, and aluminum-copper alloy.

3. The material dispense pump of claim 1 wherein the cartridge comprises copper.

4. The material dispense pump of claim 1 further comprising an auger coupler that couples the motor axle to the auger screw, the auger coupler comprising thermally insulating material that thermally insulates the motor axle and auger screw.

5. The material dispense pump of claim 1 wherein the pump body heater comprises a heater and a temperature monitoring device and further comprising a pump body heater controller for controlling the temperature of the pump body in response to a signal received from the temperature monitoring device.

6. The material dispense pump of claim 5 wherein the pump body heater comprises a resistive heater and wherein the temperature monitoring device comprises a thermocouple.

7. The material dispense pump of claim 5 wherein the pump body heater controller, the pump body heater, and the temperature monitoring device are configured as a closed loop heat control system for controlling the temperature of the pump body.

8. The material dispense pump of claim 1 further comprising a pump body heater plate that abuts a surface of the pump body, the pump body heater plate comprising a thermally insulating material, wherein the pump body heater is seated at an outer surface the pump body heater plate to interface with the surface of the pump body.

9. The material dispense pump of claim 8 wherein the pump body heater plate further comprises a compression mechanism that urges the pump body heater toward physical contact with the surface of the pump body.

10. The material dispense pump of claim 8 further comprising a quick release mounting plate that mates with a latch plate for mounting the material dispense pump to a base, the quick release mounting plate being coupled to the pump body heater plate such that the quick release mounting plate is thermally insulated from the pump body.

11. The material dispense pump of claim 1 further comprising cartridge retention screws that retain the pump cartridge in the pump body, an outer surface of the cartridge retention screws comprising thermally insulating material.

12. The material dispense pump of claim 1 further comprising a dispense tip retention nut for mounting a dispense tip to the pump cartridge, an outer surface of the dispense tip retention nut comprising thermally insulating material.

13. The material dispense pump of claim 1 wherein the thermally insulating material comprises Ultem™.

14. The material dispense pump of claim 1 wherein the motor comprises a closed-loop servo motor having indexed rotational positions.

15. The material dispense pump of claim 1 further comprising a material reservoir heater for heating material contained in a material reservoir to be dispensed by the pump cartridge.

16. The material dispense pump of claim 15 wherein the material reservoir heater comprises a heater and a temperature monitoring device and further comprising a material reservoir heater controller for controlling the temperature of the material in response to a signal received from the temperature monitoring device.

17. The material dispense pump of claim 16 wherein the material reservoir heater comprises a resistive heater and wherein the temperature monitoring device comprises a thermocouple.

18. The material dispense pump of claim 15 further comprising a heat distribution body comprising heat conductive material in thermal communication with the material reservoir heater that houses the material reservoir and heats material contained in the reservoir.

19. The material dispense pump of claim 18 wherein the material reservoir comprises a material syringe, and wherein the heat distribution body is cylindrical in shape.

20. The material dispense pump of claim 18 further comprising a reservoir support mount for supporting the heat distribution body and the material reservoir and wherein the reservoir support mount is formed of thermally insulating material that thermally insulates the heat distribution body from the pump body.

21. The material dispense pump of claim 15 wherein the material reservoir heater controller, the material reservoir heater, and the temperature monitoring device are configured as a closed loop heat control system for controlling the temperature of the material reservoir.

22. The material dispense pump of claim 1 wherein the cartridge further comprises a material feed aperture that is elongated with respect to the primary axis of the auger screw at which material to be dispensed is introduced to the auger screw at least at a side of the auger screw.

23. The material dispense pump of claim 1 further comprising a transmission coupled between the motor and auger screw for gearing the auger screw relative to the motor.

24. The material dispense pump of claim 1 wherein the cartridge is a floating-z cartridge, the floating-z cartridge moving longitudinally relative to the pump body during a material dispensing operation.

25. A material dispense pump comprising:

a pump body formed of thermally conductive material;

a motor having an output axle;

a pump cartridge formed of thermally conductive material, the pump cartridge having an auger screw driven by the output axle of the motor for dispensing material, the pump cartridge being in thermal communication with the pump body, the pump body including a mounting location at which the pump cartridge having the auger screw is inserted into and removed from the pump body;

a pump body heater in thermal communication with the pump body apply heat to the pump body and cartridge; and a material reservoir heater in thermal communication with a material reservoir containing material to be dispensed to apply heat to the material in the material reservoir, wherein the material reservoir heater includes a first temperature control system and the pump body heater includes a second temperature control system, wherein the first and second temperature control systems operate independently of each other to control the temperature of the pump body and cartridge and the temperature of the material in the material reservoir, respectively.

26. The material dispense pump of claim 25 further comprising a motor mount that mounts the motor to the pump body, the motor mount comprising a thermally insulating material that thermally insulates the motor from the pump body.

27. The material dispense pump of claim 26 wherein the thermally insulating material comprises Ultem™.

28. The material dispense pump of claim 25 wherein the cartridge comprises a material selected from the group consisting of aluminum, copper, aluminum alloy, copper alloy, and aluminum-copper alloy.

29. The material dispense pump of claim 25 wherein the cartridge comprises copper.

30. The material dispense pump of claim 25 further comprising an auger coupler that couples the motor axle to the auger screw, the auger coupler comprising thermally insulating material that thermally insulates the motor axle and auger screw.

31. The material dispense pump of claim 25 wherein the pump body heater comprises a heater and a temperature monitoring device and further comprising a pump body heater controller for controlling the temperature of the pump body in response to a signal received from the temperature monitoring device.

32. The material dispense pump of claim 31 wherein the pump body heater comprises a resistive heater and wherein the temperature monitoring device comprises a thermocouple.

33. The material dispense pump of claim 31 wherein the pump body heater controller, the pump body heater, and the temperature monitoring device are configured as a closed loop heat control system for controlling the temperature of the pump body.

34. The material dispense pump of claim 25 further comprising a pump body heater plate that abuts a surface of the pump body, the pump body heater plate comprising a thermally insulating material, wherein the pump body heater is seated at an outer surface the pump body heater plate to interface with the surface of the pump body.

35. The material dispense pump of claim 34 wherein the pump body heater plate further comprises a compression mechanism that urges the pump body heater toward physical contact with the surface of the pump body.

36. The material dispense pump of claim 34 further comprising a quick release mounting plate that mates with a latch plate for mounting the material dispense pump to a base, the quick release mounting plate being coupled to the pump body heater plate such that the quick release mounting plate is thermally insulated from the pump body.

37. The material dispense pump of claim 25 further comprising cartridge retention screws that retain the pump cartridge in the pump body, an outer surface of the cartridge retention screws comprising thermally insulating material.

38. The material dispense pump of claim 25 further comprising a dispense tip retention nut for mounting a dispense tip to the pump cartridge, an outer surface of the dispense tip retention nut comprising thermally insulating material.

39. The material dispense pump of claim 25 wherein the motor comprises a closed-loop servo motor having indexed rotational positions.

40. The material dispense pump of claim 25 wherein the material reservoir heater comprises a heater and a temperature monitoring device and further comprises a material reservoir heater controller for controlling the temperature of the material in response to a signal received from the temperature monitoring device.

41. The material dispense pump of claim 40 wherein the material reservoir heater comprises a resistive heater and wherein the temperature monitoring device comprises a thermocouple.

42. The material dispense pump of claim 25 further comprising a heat distribution body comprising heat conductive material in thermal communication with the material reservoir heater that houses the material reservoir and heats material contained in the reservoir.

43. The material dispense pump of claim 42 wherein the material reservoir comprises a material syringe, and wherein the heat distribution body is cylindrical in shape.

44. The material dispense pump of claim 42 further comprising a reservoir support mount for supporting the heat distribution body and the material reservoir and wherein the reservoir support mount is formed of thermally insulating material that thermally insulates the heat distribution body from the pump body.

45. The material dispense pump of claim 25 wherein the material reservoir heater controller, the material reservoir heater, and the temperature monitoring device are configured as a closed loop heat control system for controlling the temperature of the material reservoir.

46. The material dispense pump of claim 25 wherein the cartridge further comprises a material feed aperture that is elongated with respect to the primary axis of the auger screw at which material to be dispensed is introduced to the auger screw at least at a side of the auger screw.

47. The material dispense pump of claim 25 further comprising a transmission coupled between the motor and auger screw for gearing the auger screw relative to the motor.

48. The material dispense pump of claim 25 wherein the cartridge is a floating-z cartridge, the floating-z cartridge moving longitudinally relative to the pump body during a material dispensing operation.

49. A method for controlling a material dispense pump comprising:

controlling the temperature of a pump body, the pump body formed of thermally conductive material and having a pump cartridge formed of thermally conductive material, the pump cartridge having an auger screw driven by a motor for dispensing material, the pump cartridge being in thermal communication with the pump body, the pump body including a mounting location at which the pump cartridge having the auger screw is inserted into and removed from the pump body; and controlling the temperature of a material reservoir containing material to be dispensed by the pump cartridge, wherein controlling the temperature of the pump body and controlling the temperature of the material reservoir are independent of each other.

50. The method of claim 49 wherein controlling the temperature of the pump body comprises monitoring the temperature of the pump body, and applying heat to the pump body in response to monitored temperature.

51. The method of claim 49 wherein controlling the temperature of the material reservoir comprises monitoring the temperature of the material reservoir, and applying heat to the material reservoir in response to monitored temperature.

52. The method of claim 49 wherein during a material dispensing operation a material feed aperture of the cartridge is elongated with respect to the primary axis of the auger screw, at which material to be dispensed is introduced to the auger screw at least at a side of the auger screw.

53. The method of claim 49 further comprising coupling a transmission between the motor and auger screw for gearing the auger screw relative to the motor.

54. The method of claim 49 wherein the cartridge is a floating-z cartridge, the floating-z cartridge moving longitudinally relative to the pump body during a material dispensing operation.

55. A material micro-dispense pump comprising:

a pump body formed of thermally conductive material;

a motor having an output axle;

a pump cartridge formed of thermally conductive material, the pump cartridge having an auger screw driven by the output axle of the motor for dispensing material and a material feed aperture that is elongated with respect to the primary axis of the auger screw at which material to be dispensed is introduced to the auger screw at least at a side of the auger screw, wherein the pump cartridge is in thermal communication with the pump body, the pump body including a mounting location at which the pump cartridge having the auger screw is inserted into and removed from the pump body;

a motor mount that mounts the motor to the pump body, the motor mount comprising a thermally insulating material that thermally insulates the motor from the pump body; and a pump body heater that generates heat by resistive heating, the pump body heater in direct thermal contact with the pump body to apply the heat to the pump body and cartridge.

56. The material micro-dispense pump of claim 55 further comprising a material reservoir heater in thermal communication with a material reservoir containing material to be dispensed for applying heat to the material, wherein the material reservoir heater and pump body heater operate independently to control the temperature of the pump body and cartridge and the temperature of the material.

57. A material micro-dispense pump comprising:

a pump body formed of thermally conductive material;

a motor having an output axle;

a pump cartridge formed of thermally conductive material, the pump cartridge having an auger screw driven by the output axle of the motor for dispensing material, the pump cartridge being in thermal communication with the pump body, the pump body including a mounting location at which the pump cartridge having the auger screw is inserted into and removed from the pump body;

a transmission coupled between the motor and auger screw for gearing the auger screw relative to the motor;

a motor mount that mounts the motor to the pump body, the motor mount comprising a thermally insulating material that thermally insulates the motor from the pump body; and a pump body heater that generates heat by resistive heating, the pump body heater in direct thermal contact with the pump body to apply the heat to the pump body and cartridge.

58. The material micro-dispense pump of claim 57 further comprising a material reservoir heater in thermal communication with a material reservoir containing material to be dispensed for applying heat to the material, wherein the material reservoir heater and pump body heater operate independently to control the temperature of the pump body and cartridge and the temperature of the material.

59. A material micro-dispense pump comprising:

a pump body formed of thermally conductive material;

a motor having an output axle;

a floating-z pump cartridge formed of thermally conductive material, the pump cartridge having an auger screw driven by the output axle of the motor for dispensing material, the pump cartridge being in thermal communication with the pump body, the cartridge moving longitudinally relative to the pump body during a material dispensing operation, the pump body including a mounting location at which the pump cartridge having the auger screw is inserted into and removed from the pump body;

a motor mount that mounts the motor to the pump body, the motor mount comprising a thermally insulating material that thermally insulates the motor from the pump body; and a pump body heater that generates heat by resistive heating, the pump body heater in direct thermal contact with the pump body to apply the heat to the pump body and cartridge.

60. The material micro-dispense pump of claim 59 further comprising a material reservoir heater in thermal communication with a material reservoir containing material to be dispensed for applying heat to the material, wherein the material reservoir heater and pump body heater operate independently to control the temperature of the pump body and cartridge and the temperature of the material.

61. A material dispense pump comprising:

a pump body formed of thermally conductive material;

a motor having an output axle;

a pump cartridge formed of thermally conductive material, the pump cartridge having an auger screw driven by the output axle of the motor for dispensing material, the pump cartridge being in thermal communication with the pump body;

a motor mount that mounts the motor to the pump body, the motor mount comprising a thermally insulating material that thermally insulates the motor from the pump body;

a pump body heater in thermal communication with the pump body for applying heat to the pump body and cartridge; and a pump body heater plate that abuts a surface of the pump body, the pump body heater plate comprising a thermally insulating material, wherein the pump body heater is seated at an outer surface the pump body heater plate to interface with the surface of the pump body, wherein the pump body heater plate further comprises a compression mechanism that urges the pump body heater toward physical contact with the surface of the pump body.

62. A material dispense pump comprising:

a pump body formed of thermally conductive material;

a motor having an output axle;

a pump cartridge formed of thermally conductive material, the pump cartridge having an auger screw driven by the output axle of the motor for dispensing material, the pump cartridge being in thermal communication with the pump body;

a motor mount that mounts the motor to the pump body, the motor mount comprising a thermally insulating material that thermally insulates the motor from the pump body;

a pump body heater in thermal communication with the pump body for applying heat to the pump body and cartridge;

a pump body heater plate that abuts a surface of the pump body, the pump body heater plate comprising a thermally insulating material, wherein the pump body heater is seated at an outer surface the pump body heater plate to interface with the surface of the pump body; and a quick release mounting plate that mates with a latch plate for mounting the material dispense pump to a base, the quick release mounting plate being coupled to the pump body heater plate such that the quick release mounting plate is thermally insulated from the pump body.

63. A material dispense pump comprising:

a pump body formed of thermally conductive material;

a motor having an output axle;

a pump cartridge formed of thermally conductive material, the pump cartridge having an auger screw driven by the output axle of the motor for dispensing material, the pump cartridge being in thermal communication with the pump body;

a pump body heater in thermal communication with the pump body for applying heat to the pump body and cartridge;

a material reservoir heater in thermal communication with a material reservoir containing material to be dispensed for applying heat to the material, wherein the material reservoir heater and pump body heater operate independently to control the temperature of the pump body and cartridge and the temperature of the material; and a pump body heater plate that abuts a surface of the pump body, the pump body heater plate comprising a thermally insulating material, wherein the pump body heater is seated at an outer surface the pump body heater plate to interface with the surface of the pump body, wherein the pump body heater plate further comprises a compression mechanism that urges the pump body heater toward physical contact with the surface of the pump body.

64. A material dispense pump comprising:

a pump body formed of thermally conductive material;

a motor having an output axle;

a pump cartridge formed of thermally conductive material, the pump cartridge having an auger screw driven by the output axle of the motor for dispensing material, the pump cartridge being in thermal communication with the pump body;

a pump body heater in thermal communication with the pump body for applying heat to the pump body and cartridge;

a material reservoir heater in thermal communication with a material reservoir containing material to be dispensed for applying heat to the material, wherein the material reservoir heater and pump body heater operate independently to control the temperature of the pump body and cartridge and the temperature of the material;

a pump body heater plate that abuts a surface of the pump body, the pump body heater plate comprising a thermally insulating material, wherein the pump body heater is seated at an outer surface the pump body heater plate to interface with the surface of the pump body; and a quick release mounting plate that mates with a latch plate for mounting the material dispense pump to a base, the quick release mounting plate being coupled to the pump body heater plate such that the quick release mounting plate is thermally insulated from the pump body.

* * * * *